United States Patent

Yamanaka et al.

[11] 4,300,823
[45] * Nov. 17, 1981

[54] AUTO-FOCUS CAMERA HAVING A RANGEFINDER

[75] Inventors: Akira Yamanaka; Toshinori Imura, both of Sakai, Japan

[73] Assignee: Minolta Camera Kabushiki Kaisha, Azuchi, Japan

[ * ] Notice: The portion of the term of this patent subsequent to Jan. 8, 1997, has been disclaimed.

[21] Appl. No.: 60,864

[22] Filed: Jul. 26, 1979

Related U.S. Application Data

[63] Continuation of Ser. No. 946,423, Sep. 25, 1978, abandoned.

[30] Foreign Application Priority Data

Sep. 30, 1977 [JP] Japan .............................. 52-118317

[51] Int. Cl.$^3$ .............................................. G03B 3/10
[52] U.S. Cl. ...................................... 354/25; 354/163; 354/195; 352/140
[58] Field of Search ............... 354/25, 195, 289, 163; 352/140; 355/56

[56] References Cited

U.S. PATENT DOCUMENTS

| | | | |
|---|---|---|---|
| Re. 27,461 | 8/1972 | Harvey | 354/25 |
| 3,435,744 | 4/1969 | Stimson | 354/25 |
| 3,442,193 | 5/1969 | Pagel | 354/25 |
| 3,443,502 | 5/1969 | Harvey | 354/25 |
| 3,532,045 | 10/1970 | Genähr | 354/25 |
| 3,618,499 | 11/1971 | Harvey | 354/25 |
| 3,736,057 | 5/1973 | Harvey | 354/25 |
| 3,927,414 | 12/1975 | Moriyana et al. | 354/195 |
| 3,945,023 | 3/1976 | Stauffer | 354/25 |
| 4,065,778 | 12/1977 | Harvey | 354/25 |
| 4,160,587 | 7/1979 | Heiniger | 354/25 |
| 4,182,555 | 1/1980 | Imura | 354/25 |

Primary Examiner—L. T. Hix
Assistant Examiner—Stafford D. Schreyer
Attorney, Agent, or Firm—Wenderoth, Lind & Ponack

[57] ABSTRACT

An auto-focus camera comprising a rangefinder system, an automatic focus adjusting system, a manipulatable zone selector mechanism and a selector switch for electrically connecting the automatic focus adjusting system selectively to the rangefinder system and to the manipulatable zone selector mechanism depending upon the position of the selector switch. In one operative mode, an automatic focus control signal indicative of the zonal distance of the target object to be photographed to the camera and generated from the rangefinder system is applied to the automatic focus adjusting system to bring an objective lens assembly to one of focal positions determined by the automatic focus control signal. In another operative mode, a manual focus control signal indicative of a desired one of the focal positions of the objective lens assembly is applied to the automatic focus adjusting system to bring an objective lens assembly to the desired focal position.

11 Claims, 5 Drawing Figures

AUTO-FOCUS CAMERA HAVING A RANGEFINDER

CROSS REFERENCE TO RELATED APPLICATIONS

This application is a Continuation of U.S. Application Ser. No. 946,423, filed Sept. 25, 1978 now abandoned.

BACKGROUND OF THE INVENTION

The present invention generally relates to a photographic camera having an automatic focusing device for automatically moving an objective lens of the camera to one of different focal positions whereat an image of a target object formed on a focal plane in the camera is in proper focus.

There is known an auto-focus camera utilizing a zone-monitoring rangefinder which basically comprises a light emitter for projecting a beam of light to illuminate the target object located within one of zones of distances away from the camera, a light receiver for detecting the beam of light reflected from the target object and including photoresponsive elements so arranged as to monitor the respective zones of distances, each of the photoresponsive elements having a parameter the magnitude of which varies as a function of the intensity of the beam of light detected thereby, and means coupled to the light receiver and responsive to change in magnitude of the parameter of any one of the photoresponsive elements to provide an automatic focus control signal necessary to actuate a trigger mechanism to bring the objective lens to one of the focal positions which corresponds to the distance range from the camera to such one of the zones of distances when the magnitude of one of the photoresponsive elements monitoring such one of the zones of distances has actually varied due to the presence of the target object in such one of the zones.

Examples of the auto-focus camera of the type referred to above are disclosed in the U.S. Pat. No. Re. 27,461 reissued on Aug. 15, 1972, the U.S. Pat. No. 3,723,003 patented on Mar. 27, 1973, and the Japanese Patent Laid-open Publication No. 49-49625 laid open to public inspection on May 14, 1974.

There is also known an auto-focus camera utilizing a zonal rangefinder which basically comprises first and second stationary receiving means for receiving radiation from a target object along first and second spatially separated light paths, respectively, stationary sensing means arranged to provide electrical signals representative of the relative position of the intensity distribution of the radiation passing through the first stationary receiving means with respect to the position of the intensity distribution of the radiation passing through the second stationary receiving means, and circuit means responsive to the electrical signals to provide a focus control signal representative of the distance between the target object and the camera.

The auto-focus camera utilizing the zonal rangefinder of the type referred to above is disclosed in the U.S. Pat. No. 3,945,023 patented on Mar. 16, 1978.

In the auto-focus camera disclosed in any one of the prior art references referred to above, the focus adjustment to bring the camera objective lens to one of the focal positions whereat the image of the target object to be photographed is in proper focus on a focal plane in the camera is substantially completely automated.

On the other hand, when it comes to a manual focus adjustment capability, it appears that the conventional auto-focus camera requires the operator or photographer to adjust the position of the camera objective lens manually in accordance with the estimation of the camera-to-object distance or until the image of the target object appearing in the viewfinder arrangement is sharply focused. In this case, the substantially whole number of electric and/or electronic circuit components necessary to achieve the automatic focus adjustment are generally rendered inoperative. In particular, when the electric and/or electronic circuit components necessary to achieve the automatic focus adjustment are to be rendered inoperative, what is most important is to disengage the trigger mechanism operable to move the camera objective lens to any one of the focal positions, which may be constituted by a pinion and rack arrangement or a pawl and tooth arrangement, so that a drive will not be transmitted from a drive unit, either an electric motor or an electromagnetic device, to the camera objective lens.

However, where the trigger mechanism includes a biasing spring for urging the camera objective lens to either one of the near and hyperfocal positions, the manual focus adjustment capability cannot be appreciated.

On the other hand, even though the trigger mechanism does not include such a biasing spring as described above, the camera must have a conventional device or devices which enable the operator to focus the camera objective lens properly by visually observing the quality or composition of one or more images of the target object to be photographed and/or the estimation of the camera-to-object distance, separately of a device or devices which are required to achieve the automatic focus adjustment. This appears to involve the increased cost of manufacture of the auto-focus camera.

SUMMARY OF THE INVENTION

Accordingly, the present invention has been made to provide an improved auto-focus camera having both the automatic focus adjustment capability and the manual focus adjustment capability, the manual focus adjustment capability being to be understood as meaning that the focus adjustment can be effected without the operator to manipulate the focus adjusting ring to move the camera objective lens, but by the utilization of a manual focus control signal, similar in nature to the automatic focus control signal, generated at the will of the operator.

Another object of the present invention is to provide an improved auto-focus camera of the type referred to above, which comprises a rangefinder system, an automatic focus adjusting system operatively associated with the rangefinder system and means for disabling the rangefinder system, said disabling means being operable to operate the automatic focus adjusting system when the operator desires to adjust the camera objective lens to any one of the focal positions at his or her will.

A further object of the present invention is to provide an improved auto-focus camera of the type referred to above, wherein a manipulatable zone selector is utilized for providing the manual focus control signal to operate the automatic focus adjusting system when and so long as the rangefinder system is disabled.

A still further object of the present invention is to provide an improved auto-focus camera of the type referred to above, which is easy to handle, simple in construction and low in manufacturing cost for a camera of the kind to which the present invention pertains.

In accomplishing these and other objects of the present invention, there is provided, in accordance with the present invention, an improved auto-focus camera comprising, in combination, a rangefinder system, an automatic focus adjusting system, a manipulatable zone selector mechanism and a selector switch for electrically connecting the automatic focus adjusting system selectively to the rangefinder system and to the manipulatable zone selector mechanism depending upon the position of the selector switch. More specifically, in one position of the selector switch, the automatic focus control signal generated from the rangefinder system is applied to the automatic focus adjusting system to energize a drive unit to move the camera objective lens to one of the focal positions which corresponds to one of the zones of distances actually occupied by the target object and whereat the image of the target object is, therefore, in focus on the focal plane in the camera.

On the other hand, in another position of the selector switch, the manipulatable zone selector mechanism generates the manual focus control signal which is applied to the automatic focus adjusting system to energize the drive unit to move the camera objective lens to one of the focal positions which has been selected at the will of the operator and which may not, therefore, be always the one whereat the image of the target object is in focus on the focal plane in the camera unless the estimation of the camera-to-object distance made by the operator matches the reading to which the manipulatable zone selector mechanism has been set by the operator.

Furthermore, in accordance with the present invention, the camera is preferably provided with a zone display unit including light emitting elements equal in number to the number of the photoresponsive elements employed for visually presenting a zone marking indicative of which zone of distances the target object occupies, during the automatic focus adjustment capability. This zone display unit may be installed in a conventional viewfinder arrangement in the photographic camera or at any appropriate position viewable by the operator.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
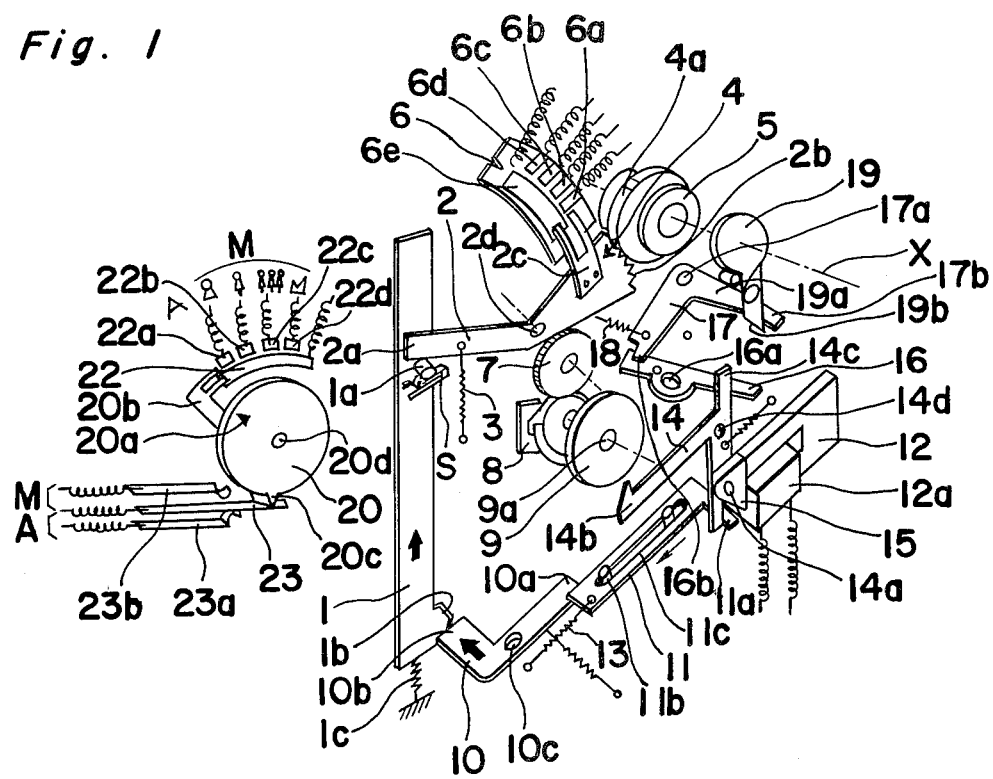
FIG. 1 is a pictorial perspective view, with some elements exploded, of a photographic camera according to one preferred embodiment of the present invention.

Before the description of the present invention proceeds, it is to be noted that like parts are designated by like reference numerals throughout the accompanying drawings.

Although not shown, a photographic camera to which the concept of the present invention is applied is to be understood as including, as its principal components, an objective lens, which may be constituted by one or more lens elements; a focal plane where a light sensitive film is located; a shutter cocking or charging mechanism for bringing a shutter mechanism in a cocked or charged position in readiness for an actual taking of a photographic picture, the shutter cocking or charging mechanism being generally associated with a manipulatable film advancing lever so that, upon completion of movement of the film advancing lever to advance the light sensitive film one frame to another past a definite position where exposure of the film takes place, the shutter mechanism can be set in the cocked or charged position; a viewfinder arrangement through which the camera is aimed at a target object to be photographed; and a shutter release button which, when depressed, releases the shutter mechanism from the cocked or charged position to achieve the exposure of the film.

All of these principal components of the photographic camera as well as their operative correlationship are well known to those skilled in the art and, therefore, the details thereof are herein omitted for the sake of brevity. However, in accordance with the present invention, the photographic camera of the type referred to above further includes a rangefinder system, an automatic focus adjusting system, and a manipulatable zone selector, all of which will now be described with reference to the accompanying drawings.

Referring now to FIG. 1, there is illustrated the automatic focus adjusting system and the manipulatable zone selector. The automatic focus adjusting system is operatively associated with a known shutter release lever 1 normaly urged to an inoperative position by a spring element 1c in a direction as indicated by the arrow a, but capable of being moved to a release position against the spring element 1c in response to the depression of the shutter release button referred to above. The automatic focus adjusting system comprises an adjusting lever 2 pivotally supported at 2d by means of a pin member (not shown) for movement between first and second positions. This adjusting lever 2 has one end formed at its end face with teeth 2b and the other end 2a constantly engaged to an engagement pin 1a, rigidly mounted on the shutter release lever 1, by means of a spring element 3. The adjusting lever 2 is pivotable between first and second positions about the pin member extending through a substantially intermdiate portion 2d of the lever 2, but is normally urged by the spring element 3 to pivot towards the second position, however, the biasing force of the spring element 1c being so greater than the biasing force of the spring element 3 that, so long as the shutter release lever 1 is held in the inoperative position, the lever 2 is also held in the first position against the spring element 3.

The adjusting lever 2 carries an electrically conductive bridge member 2c on a portion of the lever 2 adjacent to the teeth 2b in an electrically insulated relation to said lever 2, the function of said bridge member 2c being described later.

The automatic focus adjusting system further comprises an adjusting ring 4 mounted on an objective lens barrel 5 in a manner as will be described later, said adjusting ring 4 having its outer peripheral surface formed with mating teeth 4a to which the teeth 2b in the adjusting lever 2 are constantly engaged. In the construction so far described, it is clear that, as the shutter release lever 1 is moved from the inoperative position towards the release position in response to the depression of the shutter release button, the adjusting lever 2 is pivoted from the first position towards the second position by the action of the spring element 3 with the end 2a constantly engaged to the engagement pin 1a, whereby the adjusting ring 4 can be rotated about the optical axis X of the objective lens, supported by the objective lens barrel 5, by the engagement between the teeth 2b and the mating teeth 4a on the adjusting ring 2. The adjusting ring 4 is mounted on the objective lens barrel 5 in such a manner as to cause the objective lens, carried by the objective lens barrel 5, to move axially between near and hyperfocal positions through one or more intermediate focal positions as the adjusting ring 4 is rotated in the manner as hereinbefore described. For this purpose, any known motion translator may be employed between the adjusting ring 4 and the objective lens barrel 5.

It is to be noted that, so long as the shutter release lever 1 is held in the inoperative position as shown in FIG. 1, the objective lens barrel is maintained at either one of the near and hyperfocal positions, for example, at the near position in the illustrated embodiment. Therefore, the rotation of the adjusting ring 4 in one direction incident to the movement of the shutter release lever 1 towards the release position against the spring element 1c and the consequent pivotal movement of the lever 2 towards the second position results in the movement of the objective lens barrel 5, more particularly, the objective lens carried by the objective lens barrel 5, from the near position towards the hyperfocal position and the reverse rotation of the ring 4 in the opposite direction incident to the return movement of the shutter release lever 1 towards the inoperative position and the consequent pivotal movement of the lever 2 towards the first position results in the movement of the objective lens barrel 5 back towards the near position. It is to be noted that, during the movement of the objective lens barrel 5 axially along the optical path X between the near and hyperfocal positions, the barrel 5 can pass through one or more inermediate focal positions, the number of said intermediate focal positions being chosen to be two for the purpose of description of the present invention.

Figure 2:
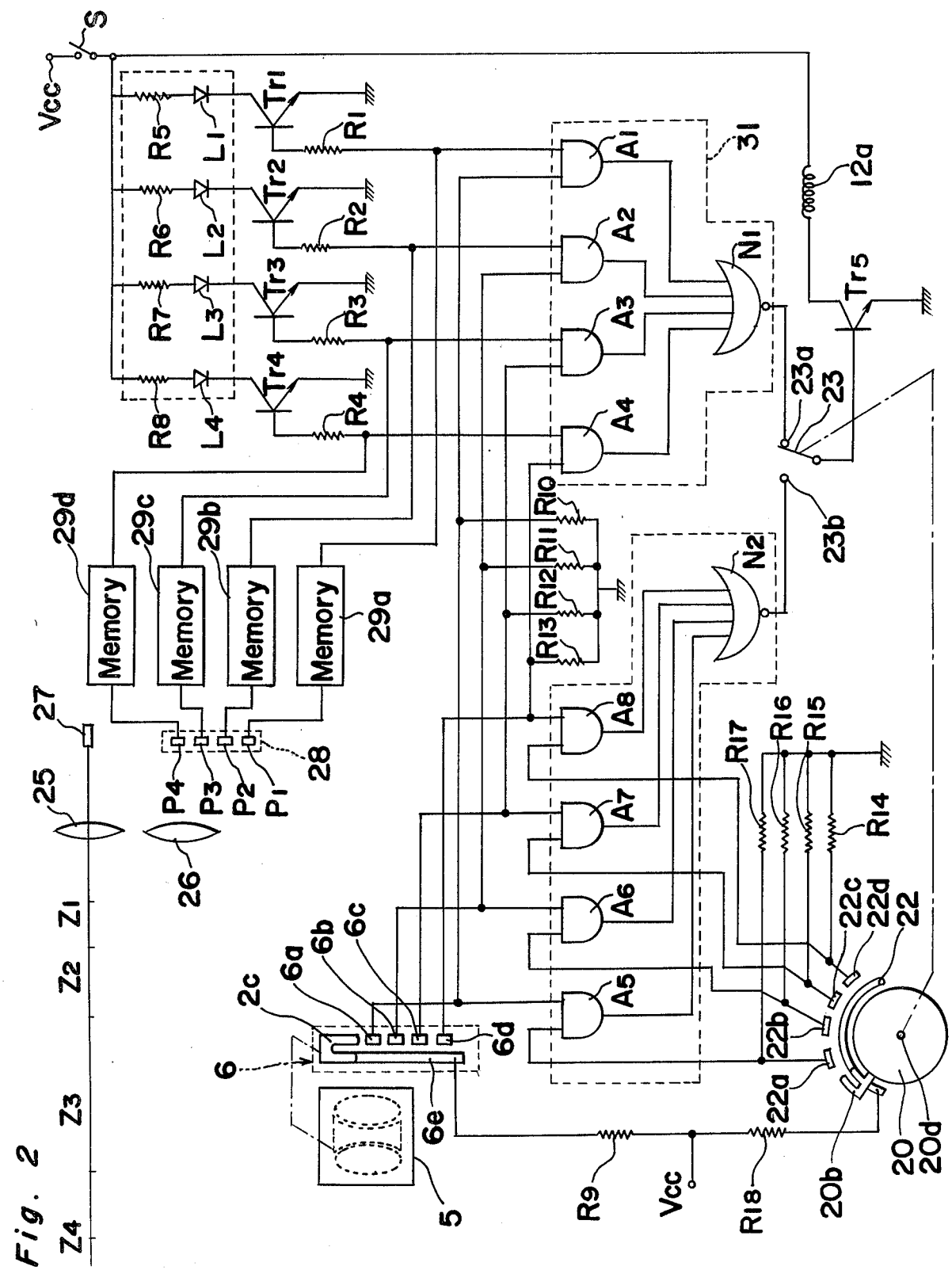
FIG. 2 is an electric circuit diagram used in the autofocus camera shown in FIG. 1.

Positioned on the path of movement of the bridge member 2c carried by the adjusting lever 2 is a position detector 6 for generating an electrical signal indicative of the position of the objective lens barrel 5. This position detector 6 is employed in the form of a printed circuit board and is constituted by electrodes 6a, 6b, 6c and 6d, equal in number to the number of the focal positions of the objective lens barrel 5 including the near and hyperfocal positions, and a common electrode 6e electrically connected to a power source Vcc through a resistor R9 as shown in FIG. 2. This position detector 6 is so designed that, as the adjusting lever 2 is pivoted from the first position towards the second position, the electrodes 6a to 6d are sequentially electrically connected to the common electrode 6e through the bridge member 2c movable together with the lever 2.

The focus adjusting lever 2 has a gear wheel 7 rigidly carried thereby for rotation together with said lever 2 about the point of pivot 2d of the lever 2, the rotation of said gear wheel 7 incident to the pivotal movement of the focus adjusting lever 2 between the first and second positions being transmitted through a known governor 8 to a ratchet wheel 9 which is rotatably mounted on a support shaft 9a.

The illustrated photographic camera includes a shutter release mechanism which includes, in addition to the shutter release lever 1, an angle member 1b, integrally formed with one end of said lever 1 and protruding in a direction at right angles to the lever 1, a pivotable lever 10, a slide 11, an electromagnet unit 12, an operating lever 14 of substantially T-shaped configuration, an intermediate lever 16, and an actuating lever 17. The pivotable lever 10 is supported at 10c for pivotal movement between engaged and disengaged positions and has one end 10b, slidingly engaged to the angle member 11, and the other end formed with a detent recess 10a to which one end of the slide 11 is engageable as will subsequently be described. It is to be noted that the pivotable lever 10 is normally biased to the engaged position by the action of a spring element (not shown) and can be pivoted towards the disengaged position as the shutter release lever 1 is moved towards the release position with the angle member 1b forcing the pivotable lever 10 to pivot towards such disengaged position against the spring element (not shown).

The slide 11 is supported for movement between trapped and released positions by means of a plurality of, for example, two, pin members 11b loosely extending through a slot 11c defined in said slide 11 and is normally biased by a spring element 13 so as to move towards the released position. One end of the slide 11 remote from the pivotable lever 10 is integrally formed with a finger 11a. This slide 11 is, so long as the shutter release lever 1 is held in the inoperative position as shown and, therefore, the pivotable lever 10 is held in the engaged position, held in the trapped position with the other end of said slide 11 engaged in the detent recess 10a against the biasing force of the spring element 13.

The operating lever 14 of substantially T-shaped configuration is supported at 14d for pivotal movement between first and second positions and has three arms 14a, 14b and 14b. The arm 14a is engageable with the finger 11a of the slide 11 and has a magnetizable piece 15 pivotally connected thereto, the arm 14b has its free end formed with a tooth engageable with the ratchet wheel 9, and the arm 14c is engageable with the intermediate lever 16 in a manner as will be described later. This operating lever 14 is normally biased by a spring element towards the first position when and so long as the slide 11 is held in the trapped position, but can be pivoted towards the second position against the spring element as the slide 11 is moved towards the released position.

The electromagnet unit 12 is so designed as to exert a magnetic force of attraction when energized with an electric current supplied through a coil 12a, and attracts the magnetizable piece 15, carried by the operating lever 14, to hold the latter in the first position and, therefore, the slide 11 in the trapped position as shown. Energization of the electromagnet unit 12, that is, supply of the electric current to the coil 12, is initiated upon closure of a switch S which is effected by the engagement pin 1a subsequent to the start of and during the movement of the shutter release lever 1 from the inoperative position towards the release position.

In the construction so far described, it will readily be seen that, when the electromagnet unit 12 is deenergized in a manner as will be described later, the operating lever 14 is pivoted clockwise, as viewed in FIG. 1, about the pivot 14d towards the second position by the action of the pulling force of the spring element 13 which is then transmitted to said arm 11a of the operating lever 14 through the finger 11a of the slide 11. In practice, since deenergization of the electromagnet unit 12 takes place shortly before or simultaneously with the completion of movement of the shutter release lever 1 to the release position with the pivotable lever 10 pivoted to the disengaged position, the slide 11 is free to move towards the release position by the action of the spring element 13 at the time of the deenergization of the electromagnet unit 12.

The pivotal movement of the operating lever 14 towards the released position, which takes place in the manner as hereinabove described, results in interruption of rotation of the ratchet wheel 9 to halt the movement of the objective lens barrel 5 from from the near position towards the hyperfocal position and, simultaneously or substantially simultaneously therewith, shutter release to bring a shutter member 19 to a position clear of the optical path X of the objective lens.

More specifically, when the operating lever 14 is pivoted clockwise about the pivot 14d to the second position subsequent to deenergization of the electromagnet unit 12, the tooth on the arm 14b of said operating lever 14 is engaged to the ratched wheel 9 to hald the rotation of said wheel 9 which has been effected by the rotation of the focus adjusting lever 2 from the first position towards the second position through the gear 7 by way of the governor 8. On the other hand, the pivotal movement of the operating lever 14 is transmitted to the intermediate lever 16 through the arm 14c.

The intermediate lever 16 is supported at 16a for pivotal movement between first and second positions and is normally biased to the first position by a spring element and has one end engageable with the arm 14c of the operating lever 14 and the other end formed with an engagement recess 16b into which is engaged one end of the actuating lever 17 supported at 17a for pivotal movement between cocked and released positions. This actuating lever 17 is, when the operating lever 14 is held in the first position as shown, held in the cocked position with said one end of the lever 17 engaged in the engagement recess 16b in the intermediate lever 16, but is biased by a spring element 18 so as to pivot towards the released position.

The actuating lever 17 is so operatively associated with the shutter member 19 that, when the actuating lever 17 is pivoted from the cocked position towards the released position as pulled by the spring element 18 upon disengagement of said one end of the actuating lever 17 from the engagement recess 16b in the intermediate lever 16, the other end 17b of said actuating lever 17 kicks the shutter member 19 to cause the latter to instantaneously move between opened and closed positions. More specifically, the shutter member 19 is supported for pivotal movement between the closed position, in which the passage of the incident light towards the light sensitive film (not shown) through the objective lens is interrupted, and the opened position in which the shutter member 19 is brought to a position clear of the optical path X to allow the passage of the incident light towards the light sensitive film through the objective lens, but is normally biased by a wire spring member 19a to the closed position. This shutter member 19 has a tongue 19b integrally formed therewith and so designed that, as the end 17b of the actuating lever 17 kicks the tongue 19b during the pivotal movement of the actuating lever 17 from the cocked position towards the released position, the shutter member 19 undergoes a cycle of motion in such a manner as to pivot to the opened position against the wire spring member 19a and then back to the closed position by the action of the wire spring member 19a.

It is to be noted that the end 17b of the actuating lever 17 is located on one side of the tongue 19b, prior to the shutter member 19 moved to the opened position, and on the opposite side of the same tongue 19b subsequent to the shutter member 19 returned back to the closed position after it has been moved to the opened position. Therefore, after an actual taking of a photographic picture has been done by depressing the shutter button, the actuating lever 17 must be returned to the cocked position until the end 17b is located on said one side of the tongue 19b of the shutter member 19 in readiness for the subsequent taking of another photographic picture. This can readily be achieved by manipulating the known shutter cocking or charging mechanism so linked with said actuating lever 17 as to cause the latter to return from the released position back to the cocked position against the spring element 18 in such a manner that the end 17b of said actuating lever 17 moves past a tapered edge of the tongue 19b while concurrently forced to move in a direction away from the shutter member 19.

Referring still to FIG. 1, the manipulatable zone selector is shown in a left-hand portion of FIG. 1 and on the left of the shutter release lever 1. This manipulatable zone selector comprises a manipulatable dial 20 having a cam projection 20c, protruding outwards from the periphery of the manipulatable dial 20, and an electric bridge member 20b carried by said dial 20 and rigidly secured to said dial 20 in an electrically insulated relation. This manipulatable dial 20 is adjustably rotatable about a support shaft 20d between an "AUTO" mode position, in which the rangefinder system is operatively coupled to the automatic focus adjusting system in a manner as will be described later, and a "MANUAL" mode position in which the manipulatable zone selector is operatively coupled with the automatic focus adjusting system in a manner as will be described later. It is to be noted that the "MANUAL" mode position includes a plurality of detent positions equal in number to the number of the electrodes 6a to 6d of the position detector 6.

Positioned on the path of movement of the bridge member 20b is a common electrode 22, electrically connected to the power source Vcc through a resistor R18 as shown in FIG. 2, and electrodes 22a, 22b, 22c and 22d each being adapted to be electrically connected to the common electrode 22 through the bridge member 20b. The common electrode 22 and the electrodes 22a to 22d are to be understood as formed on a printed circuit board in a fashion similar to the position detector 6.

The manipulatable zone selector further comprises a selector switch constituted by a pliable contact member 23, having one end engageable with the cam projection 20c of the manipulatable dial 20, and a pair of fixed contact members 23a and 23b, said pliable contact member 23 being engaged to the fixed contact member 23a when and so long as the manipulatable dial 20 is held in the "AUTO" mode position as shown while the same pliable contact member 23 is engaged to the fixed contact member 23b when and so long as the manipulatable dial 20 is held in the "MANUAL" mode position, that is, when and so long as the manipulatable dial 20 can adjustably be rotated through any one of the detent positions aligned in position respectively with the electrodes 22a to 22d.

The function of the position detector 6 and the manipulatable zone selector will be described in details in connection with an electric circuit shown in FIG. 2, reference to which will now be made.

Referring now to FIG. 2, the rangefinder system comprises first and second convergent lenses 25 and 26 arranged in side-by-side relation to each other with their respective optical axes spaced a predetermined distance from each other. The rangefinder system further comprises a light emitter 27, which may be constituted by a light emitting diode and which is positioned behind the first convergent lens 25 in terms of the direction in which the photographic camera is aimed at a target object to be photographed, and a light receiver 28 which includes a plurality of, for example, four, photoresponsive elements P1, P2, P3 and P4 and which is positioned behind the second convergent lens 26 and offset laterally relative to the light emitter 27. The light emitter 27 is to be understood as capable of emitting a pulse of light therefrom towards the target object, which may be located within one of zones Z1, Z2, Z3 and Z4 of distances away from the photographic camera, through the first convergent lens 25 in response to an initial depression of the shutter release button, that is, after the shutter release lever 1 has been moved a predetermined distance from the inoperative position towards the release position. The electric circuit necessary to energize the light emitter 27 in the manner described above is well known to those skilled in the art. The photoresponsive elements P1 to P4 of the light receiver 28 are so arranged and so assigned as to monitor the respective zones Z1 to Z4 of distances, each of said photoresponsive elements P1 to P4 having a parameter the magnitude of which varies as a function of the intensity of the beam of light projected from the light emitter 27 and subsequently reflected from the target object towards one of the photoresponsive elements P1 to P4, which corresponds in position to the zone of distances which such target object occupies, through the second convergent lens 26. These photoresponsive elements P1 to P4 are electrically connected to respective memory circuits 29a, 29b, 29c and 29d. Each of these memory circuits 29a to 29d is so designed that, when the reflected beam of light transmitted through the second convergent lens 26 falls on a corresponding one of the photoresponsive elements P1 to P4, the memory circuit generates a high level signal. For example, if the reflected beam of light transmitted through the second convergent lens 26 falls on the photoresponsive element P1, the memory circuit 29a generates a high level signal; if the reflected beam of light transmitted through the second convergent lens 26 falls on the photoresponsive element P2, the memory circuit 29b generates a high level signal; if the same falls on the photoresponsive element P3, the memory circuit 29c generates a high level signal; and if the same falls on the photoresponsive element P4, the memory circuit 29d generates a high level signal.

The rangefinder system further comprises a logic circuit 31 including AND gates A1, A2, A3 and A4 each having first and second input terminals, the first input terminals of said gates A1 to A4 being respectively connected to the memory circuits 29a to 29d while the second input terminals of said gates A1 to A4 are respectively connected to the electrodes 6a to 6d of the position detector 6. The AND gates A1 to A4 have their respective output terminals electrically connected to the fixed contact member 23a of the selector switch through a NOR circuit N1. It is to be noted that the NOR circuit N1 generates a low level signal only when any one of the AND gates A1 to A4 generates a high level signal.

In the rangefinder system so far described, it will readily be seen that, if the reflected beam of light falls on, for example, the photoresponsive element P3 of the light receiver 28 and, therefore, the memory circuit 29c generates the high level signal to the first terminal of the associated AND gate A3, the AND gate A3 will be triggered on to generate a high level signal to the NOR circuit N1 only when the adjusting lever 2 is, subsequent to the movement of the shutter release lever 1 from the inoperative position towards the release position in response to the depression the shutter release button, pivoted from the first position towards the second position through a certain angular distance required for the bridge member 2c to electrically connect the common electrode 6e to the electrode 6c. Such certain angular distance through which the adjusting lever 2 is pivoted from the first position corresponds to the distance range between the camera and the zone Z3 occupied by the target object.

Simultaneously with the generation of the high level signal from the AND gate A3, the NOR circuit N1 generates the low level signal which is, when the manipulatable dial 20 is set in the "AUTO" mode position, as shown in FIG. 1, with the contact member 23 consequently engaged to the contact member 23a, applied to the base of a switching transistor Tr5 to switch the latter off, the consequence of which is that no electric current flows through the coil 12a of the electromagnet unit 12. This means that, when the AND gate A3 generates the high level signal, the electromagnet unit 12 becomes deenergized to extinguish the magnetic force of attraction used to retain the operating lever 14 to the first position. Since the pivotable lever 10 has been pivoted to the disengaged position at the time of extinction of the magnetic force of attraction from the electromagnet unit 12, the operating lever 14 is, upon deenergization of the electromagnet unit 12, allowed to pivot about the point 14d from the first position towards the second position by the action of the spring element 13, resulting in that the tooth on the arm 14b of the operating lever 14 is engaged to the ratched wheel 9 to hold the rotation of the focus adjusting lever 2 and, on the other hand, the shutter member 19 is released to undergo a cycle of movement from the closed position to the opened position and then from the opened position back to the closed position in the manner described with reference to FIG. 1.

It is to be noted that, at the time the rotation of the focus adjusting lever 2 is interrupted by the engagement of the tooth on the arm 14b of the operating lever 14 held in the second position in the manner described above, the electrode 6c of the position detector 6 is electrically connected to the common electrode 6e through the bridge member 2c.

From the foregoing, it is clear that the objective lens barrel 5 has been rotated to one of the focal positions whereat the image of the target object located within the zone Z3 is in proper focus on the focal plane in the camera.

The manipulatable zone selector includes an electric circuit for generating a manual focus control signal, which electric circuit is constituted by a logic circuit 32 similar in construction to the logic circuit 31 and including four AND gates A5, A6, A7 and A8 and a NOR circuit N2. The gates A5 to A8 have their first input terminals, electrically connected respectively to the electrodes 6a to 6d of the position detector 6, their second input terminals electrically connected respectively to the electrodes 22a to 22d of the manipulatable zone selector, and their output terminals connected to the NOR gate N2. The NOR gate N2 has its output terminal electrically connected to the contact member 23b of the selector switch.

In operation, assuming that the target object is located within the zone Z3 and if the operator turns the manipulatable dial 20, which has been positioned in the "AUTO" mode position as shown in FIG. 1, in an attempt to align an index mark 20a on the dial 20 with a zone marking representative of the distance range between the camera and the zone Z3, the cam projection 20d is disengaged from the contact member 23 to allow the latter to engage the contact member 23b by the action of the elasticity intrinsic of the contact member 23. After the electrode 22c has been electrically connected to the common electrode 22 through the bridge member 20b with the index marking 20a on the dial 20 aligned with the zone marking representative of the distance range between the camera and the zone Z3 in which the target object is located, a high level signal is applied to the second input terminal of the AND gate A7. If the shutter release lever 1 is moved from the inoperative position towards the release position during this condition, the focus adjusting lever 2 is rotated about the pivot 2d from the first position towards the second position. When the bridge member 2c carried by the adjusting lever 2 comes to such a position as to electrically connect the common electrode 6e to the electrode 6d, a high level signal is applied trode 6e to the electrode 6d, a high level signal is applied to the first input terminal of the AND gate A7 thereby triggering the latter on. Therefore, the gate A7 applies a high level signal to the NOR circuit N2 from which a low level signal is subsequently applied to the base of the transistor Tr5 to switch the latter off. This switching off of the transistor Tr5 results in deenergization of the electromagnet unit 12 and, therefore, in a manner similar to that described in connection with the automatic focus adjustment capability, the objective lens barrel 5 is retained at the focal position determined by the setting of the manipulatable zone selector on one hand and the shutter member 19 is released on the other hand to effect the photographic exposure of the light sensitive film.

With the circuit constructed as shown in FIG. 2, it is clear that, during either the automatic focus adjustment capability or the manual focus adjustment capability the electromagnet unit 12 can be energized in response to the movement of the shutter release lever 1 from the inoperative position towards the release position to allow the ratchet wheel 9 to rotate freely together with the pivotal movement of the focus adjusting lever 2.

Figure 3:
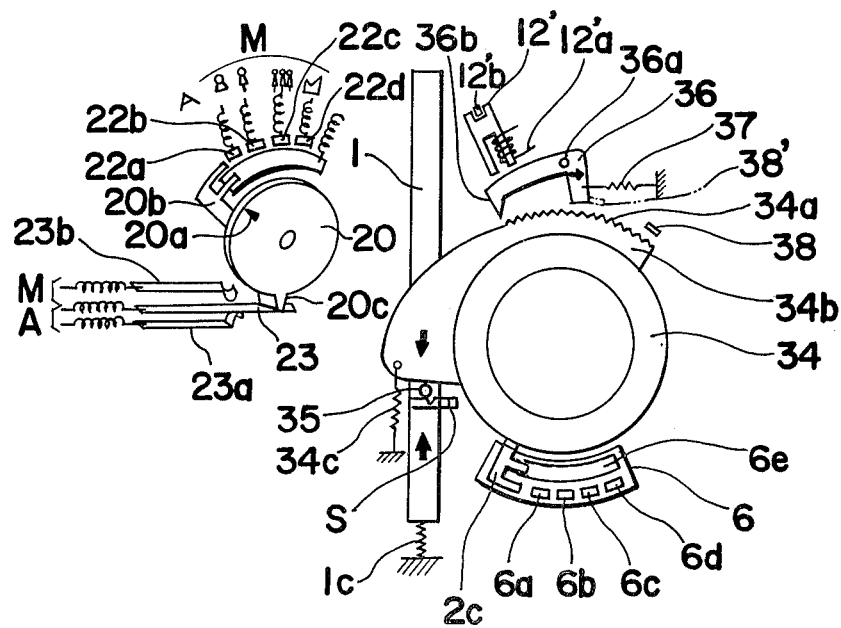
FIG. 3 is a view, similar to FIG. 1, showing the autofocus camera according to another preferred embodiment of the present invention.

In FIG. 3, another preferred form of a drive unit for moving the objective lens axially between the near and hyperfocal positions is illustrated. An element shown by 34 in FIG. 3 functionally and structurally corresponds to the focus adjusting ring, identified by 4 in FIG. 1. Although not shown, the focus adjusting ring 34 is to be understood as mounted on an objective lens barrel, as is the case with the focus adjusting ring 4 employed in the embodiment of FIG. 1, through any known motion translator such that rotation of the adjusting ring 34 results in linear movement of the objective lens barrel between the near and hyperfocal position.

The focus adjusting ring 34 has its outer periphery formed with a segment-shaped projection 34b, a portion of a radially outer perimeter of said projection 34b being formed into a series of teeth 34a. This focus adjusting ring 34 is normally biased by a spring element 34c so as to render the objective lens barrel to assume, for example, the hyperfocal position, but is positioned at the near position against the spring element 34c by the action of the spring element 1c used to urge the shutter release lever 1 to the inoperative position. It is to be noted that, in the embodiment shown in FIG. 3, the biasing force of the spring element 1c, which is greater than the biasing force of the spring element 34c, can be transmitted to the focus adjusting ring 34 through an operating pin 35 rigidly carried by the shutter release lever 1 and to which one end of the segment-shaped projection 34b is constantly engaged by the action of the spring element 34c. The shutter release lever 1 and the focus adjusting ring 34 are so operatively associated as to enable the adjusting ring 34 to rotate in one direction about the optical axis of the objective lens in response to the movement of the shutter release lever 1 from the inoperative positiontowards the release position and also in the opposite direction in response to the movement of the shutter release lever 1 from the release position back towards the inoperative position.

Positioned adjacent to and externally of the teeth 34a on the segment-shaped projection 34b is a pawl member 36 pivotally supported at 36a for movement between an engaged position, in which a pawl 36b at one end of the pawl member 36 is engaged in any one of the teeth 34a on the segment-shaped projection 34b, and a disengaged position in which the pawl 36b is disengaged from the teeth 34a. This pawl member 36 is normally biased counterclockwise about the pivot 36a by a spring element 37 to the engaged position.

However, the pawl member 36 is normally attracted by the electromagnet unit 12' by means of the magnetic force of the permanent magnet 12'b to assume the disengaged position against the spring element 37 to allow the focus adjusting ring 34 to rotate in one direction as pulled by the spring element 34c for focus adjustment, this condition being illustrated in FIG. 3.

The position detector 6 employed in the embodiment of FIG. 3 is positioned adjacent to and externally of the focus adjusting ring 34, the bridge member 2c being rigidly carried by the focus adjusting ring 34 in an electrically insulated manner. Even in this arrangement, the electrodes 6a to 6d can sequentially electrically be connected to the common electrode 6e through the bridge member 2c one at a time as the focus adjusting ring 34 is rotated.

Reference numeral 38 represents a shutter charging member which achieves a reciprocating movement defined from a solid line position 38 to a broken line position 38' and then back to the solid line position 38 in response to the shutter charging operation of the camera. By this movement of the shutter charging member 38, the pawl member 36 is set to the position as shown in FIG. 3 in which the pawl member 36 is attracted by the permanent magnetic force of 12'b and ready to rotate in a counterclockwise direction if freed from electromagnet unit 12'. The electromagnet unit 12' is to release the pawl member 36 if the coil 12'a is energized to cancel the magnetic force of the permanent magnet 12'b.

Figure 4:
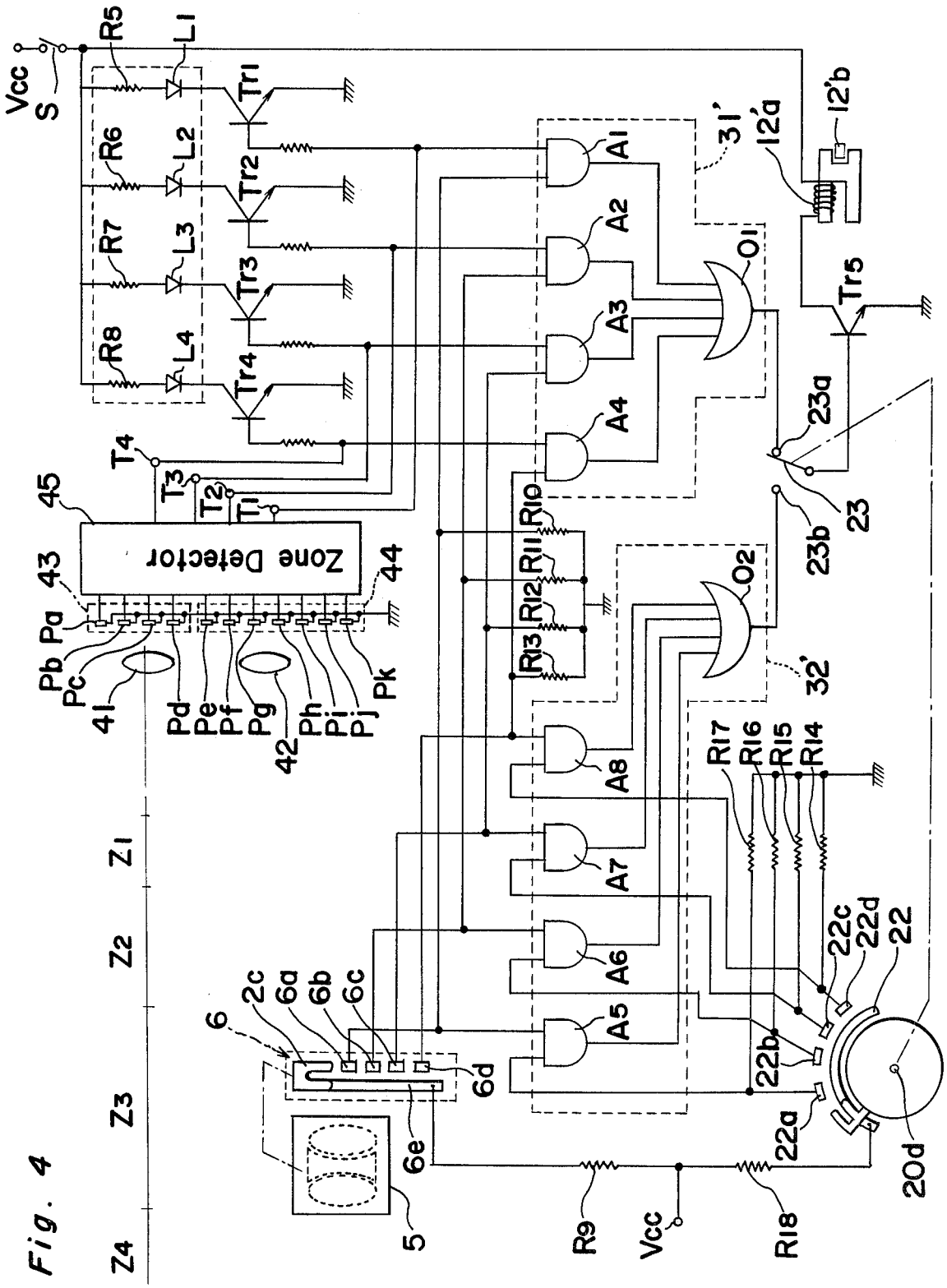
FIG. 4 is a diagram, similar to that shown in FIG. 2, showing an electric circuitry employable in the autofocus camera shown in FIG. 3.

For operating the electromagnet unit 12' employed in the embodiment of FIG. 3, the electric circuit shown in FIG. 2 may equally be used with a pair of OR circuits substituted for the NOR circuits N1 and N2. However, the employment of a circuit of a construction shown in FIG. 4 is preferred, although the circuit shown in FIG. 4 can equally be applied to operate the electromagnet unit 12 employed in the embodiment of FIG. 1 if the OR circuits O1 and O2 are replaced by a pair of NOR circuits. It is, however, to be noted that the difference between the circuit shown in FIG. 2 and that shown in FIG. 4 resides in the rangefinder system as will now be described in more detail.

Referring to FIG. 4, the rangefinder system shown comprises first and second convergent lenses 41 and 42, a first stationary sensor 43 including a plurality of, for example, four, photoresponsive elements Pa, Pb, Pc and Pd and positioned behind the first convergent lens 41 for sensing through the first convergent lens 41 radiation of light from a target object which may be located in one of the zones Z1 to Z4 along the optical path of the first convergent lens 41, and a second stationary sensor including a plurality of, for example, seven photoresponsive elements Pe, Pf, Pg, Ph, Pi, Pj and Pk and positioned behind the second convergent lens 42 and offset laterally relative to the first stationary sensor 43 for sensing radiation of light from the target object through the second convergent lens 42.

Output terminals of the photoresponsive elements Pa to Pk of the first and second stationary sensors 43 and 44 are electrically connected to a zone detector 45 having four output terminals, T1, T2, T3 and T4 which are in turn connected respectively to the first input terminals of the corresponding AND gates A1, A2, A3 and A4 of the logic circuit 31'. The photoresponsive elements Pa to Pd of the first stationary sensor 43 and the photoresponsive elements Pe to Pk of the second stationary sensor 44 are so arranged relative to the first and second convergent lenses 41 and 42 that intensities of radiated light falling on the photoresponsive elements Pa to Pd of the first stationary sensor are equal to those falling on a first group of the photoresponsive elements Ph, Pi, Pj and Pk, respectively, of the second stationary sensor when the target object is located within the zone Z1; to those falling on a second group of the photoresponsive elements Pg, Ph, Pi and Pj, respectively, of the second stationary sensor when the target object is located within the zone Z2; to those falling on a third group of the photoresponsive elements Pf, Pg, Ph and Pi, respectively, of the second stationary sensor when the target object is located within the zone Z3; and to those falling on a fourth group of the photoresponsive elements Pe, Pf, Pg and Ph, respectively, of the second stationary sensor when the target object is located within the zone Z4.

The zone detector 45 is so designed and so operable as to compare electric signals from the photoresponsive elements Pa to Pd of the first stationary sensor 43 with electric signals from the photoresponsive elements of each group in the second stationay sensor 44 and to generate output signals each being determined by which group of the photoresponsive elements in the second stationary sensor 44 has provided the electric signals most similar to the electric signals from the first stationary sensor 43. More particularly, the zone detector 45 generates a high level signal through the output terminal T1 when the electric signals from the photoresponsive elements Pa to Pd of the first stationary sensor 43 respectively match the electric signals from the first group of the photoresponsive elements Ph to Pk of the second stationary sensor 44; through the output terminal T2 when the electric signals from the photoresponsive elements Pa to Pd respectively match the electric signals from the second group of the photoresponsive elements Pg to Pj; through the output terminal T3 when the electric signals from the photoresponsive elements Pa to Pd respectively match the electric signals from the third group of the photoresponsive elements Pf to Pi; and through the output terminal T4 when the electric signals from the photoresponsive elements Pa to Pd respectively match the electric signals from the fourth group of the photoresponsive elements Pe to Ph.

Since the first to fourth groups of the photoresponsive elements Ph to Pk, Pg to Pj, Pf to Pi and Pe to Ph of the second stationary sensor 44 are respectively assigned to monitor the zones Z1, Z2, Z3 and Z4, it is clear that the output terminal T1 will be in a high level state, while the other output terminals T2 to T4 are in a low level state, if the target object is located within the zone Z1; the output terminal T2 will be in a high level state, while the other output terminals T1, T3 and T4 are in a low state, if the target object is located within the zone Z2; the output terminal T3 will be in a high level state, while the other output terminals T1, T2 and T4 are in a low level state, if the target object is located within the zone Z3; and the output terminal T4 will be in a high level state, while the other output terminals T1 to T3 are in a low level state, if the target object is located within the zone Z4.

From the foregoing, it is clear that the circuit of the construction shown in FIG. 4 functions in a manner substantially similar to the circuit of the construction shwon in FIG. 2. However, considering the drive unit shown in FIG. 3, the switching on of the transistor Tr5 due to the application of the high level signal to the base of the transistor Tr5 from either the OR circuit O1 or the OR circuit O2 by way of the selector switch results in the energization of the electromagnet unit 12 to cancel the permanent magnetic force of the permanent magnet 12'b and, simultaneously therewith, the pawl member 36 is pivoted to the engaged position to hold rotation of the focus adjusting ring 34 with the pawl 36b engaged in one of the teeth 34a which is indicative of the zone in which the target object is actually located, thereby achieving the focus adjustment. The pawl member 36, which has been pivoted to the engaged position, can be resetted back to the original, disengaged position when the shutter member is charged in readiness of the subsequent taking of a photographic picture with the shutter charge member 38 reciprocated as already described.

The photographic camera embodying the present invention and employing any one of the circuits respectively shown in FIGS. 2 and 4 preferably includes a zone display unit for visually presenting a zone marking indicative of which zone of distances the target object occupies, that is, indicative of the focal position of the objective lens to which the latter has been moved in accordance with the automatic measurement of the distance range between the target object and the camera.

This zone display unit may be installed in a known viewfinder arrangement of the camera or any appropriate position on the camera viewable by the operator or photographed and includes four light emitting diodes L1, L2, L3 and L4 having their anodes electrically connected through resistors R5, R6, R7 and R8 to the power source Vcc by way of the switch S and their cathodes grounded respectively through collector-emitter paths of transistors Tr1, Tr2, Tr3 and Tr4. The transistors Tr1 to Tr4 have their bases respectively connected to the first input terminals of the associated AND gates A1, A2, A3 and A4 of the logic circuit 31. Therefore, it is clear that, when the high level signal from any one of the memory circuits 29a to 29d in the circuit shown in FIG. 2 or appearing on any one of the output terminals T1 to T4 of the zone detector 45 in the circuit shown in FIG. 4 is applied to the base of the corresponding transistor Tr1, Tr2, Tr3 or Tr4, the latter is switched on to energize the corresponding light emitting diode L1, L2, L3 or L4.

In practice, the light emitting diodes L1 to L4 may be either colored in different colors or masked with screen members bearing different indicium so that the operator or photographer can readily ascertain the distance range between the camera and the target object in reference to the illumination given by a corresponding one of the light emitting diodes L1 to L4.

Figure 5:
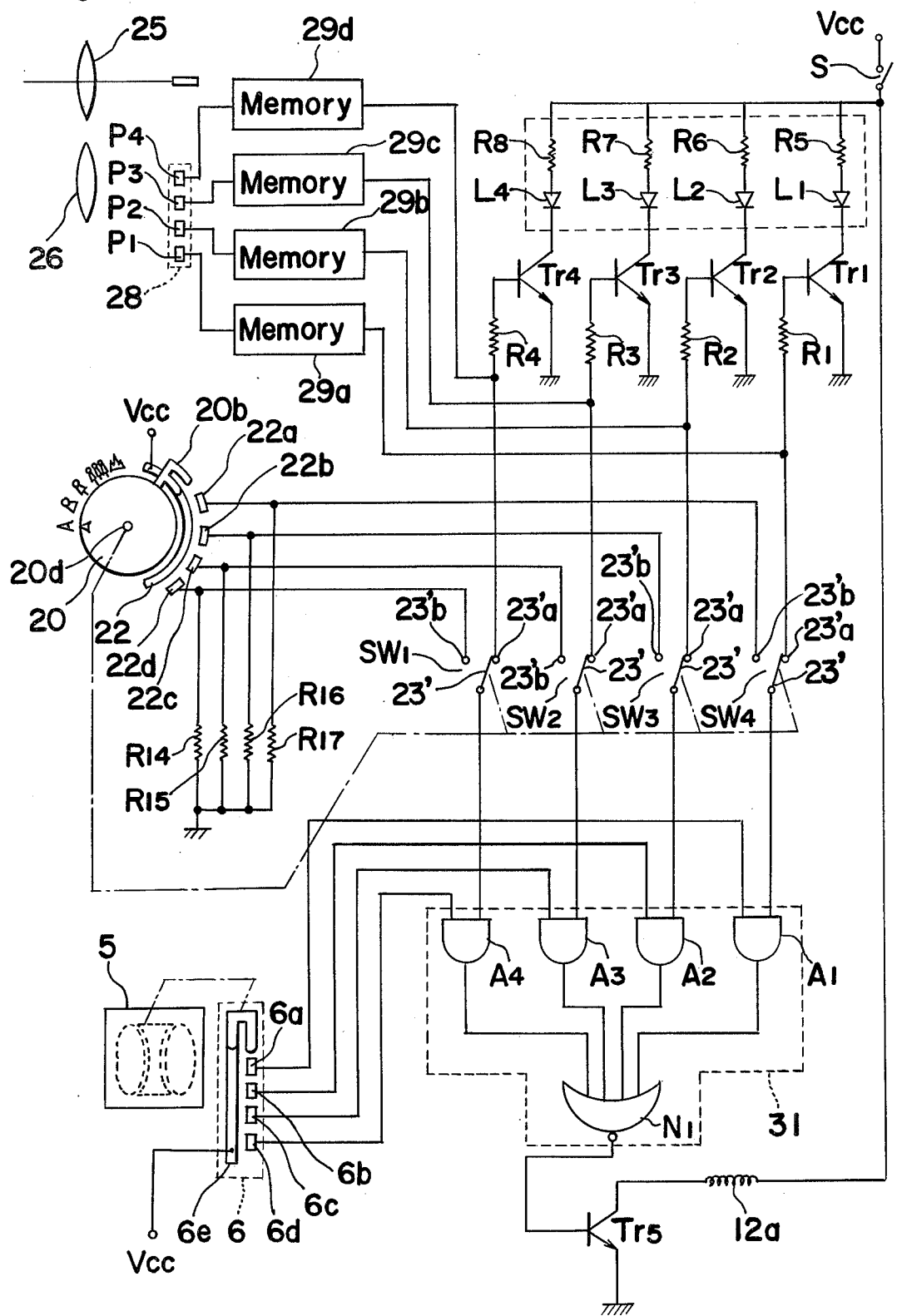
FIG. 5 is a diagram, similar to that shown in FIG. 2, showing a modified form of the electric circuitry shown in FIG. 2 according to the present invention.

Although the present invention has fully been described in connection with the preferred embodiments thereof with reference to the accompanying drawing, it is to be noted that various changes and modifications are apparent to those skilled in the art. By way of example, as shown in FIG. 5, one of the logic circuits 31 and 32 may be omitted. More specifically, where, for example, the logic circuit 32 is omitted, the selector switch which has been described as constituted by the contact members 23, 23a and 23b should be replaced with a selector switch assembly including selector switches SW1, SW2, SW3 and SW4 on one hand and the output terminal of the NOR circuit N1 should be electrically connected directly to the base of the transistor Tr5. Each of the selector switches SW1 to SW4 is of a type having a movable contact 23' and a pair of fixed contacts 23'a and 23'b, all of the movable contacts 23' of these selector switches SW1 to SW4 being operatively associated with the manipulatable dial 20 so that, when the latter is rotated from the "AUTO" mode position to any one of the detent positions included in the "MANUAL" mode position, the movable contacts 23' are respectively engaged to the fixed contacts 23'b, and when the dial 20 is rotated from any one of the detent positions included in the "MANUAL" mode position to the "AUTO" mode position, the same contacts 23' are respectively engaged to the fixed contacts 23'a. While the movable contacts 23' are respectively connected to the first input terminal of the corresponding AND gates A1 to A4, the fixed contacts 23'a are respectively connected to the memory circuits 29a to 29d and the fixed contacts 23'b are respectively connected to the electrodes 22a to 22d of the manipulatable selector mechanism. This arrangement shown in FIG. 5 can equally be applicable to the rangefinder system shown in FIG. 4.

Accordingly, such changes and modifications are to be understood as included within the true scope of the present invention unless they depart therefrom.

What we claim:

1. An auto-focus camera which comprises an objective lens means and an optical support means for supporting the objective lens means for movement in predetermined incremental displacements in a direction parallel to the optical axis of the objective lens means in relation to a target object to be photographed, the combination which comprises:

a rangefinder means for measuring the zonal distance between an image plane, where an image of the target object is to be formed, and the target object and for generating a first electric zone signal indicative of the measured zonal distance;

drive means for driving said optical support means to locate the objective lens means at any one of a plurality of focal positions;

means operatively associated with said drive means for generating an electric position signal indicative of the position of the objective lens means to which the latter has been moved by said drive means;

manipulatable means for generating a second electric zone signal utilizable to locate the objective lens means at any desired one of the focal positions;

means responsive to said position signal and any one of said first and second zone signals for generating a focus control signal only when said position signal and any one of said first and second zone signals assume a predetermined electric relationship with each other; and a mode selector switch means selectively switchable in first and second modes one at a time, said mode selector switch means in said first mode being operable to establish an electric circuit between the rangefinder means and the responsive means while an electric circuit between the manipulatable means and the responsive means is interrupted, and said mode selector switch means in the second mode being operable to establish the electric circuit between the manipulatable means and the responsive means while the electric circuit between the rangefinder means and the responsive means is interrupted, whereby when said mode selector switch means is in the first mode, said focus control signal from the responsive means is applied to the drive means for locating the objective lens means at one of the focal positions determined by the first zone signal and, when said mode selector switch means is in the second mode, said focus control signal from the responsive means is applied to the drive means for locating the objective lens means at one of the focal positions determined by the second zone signal.

2. An auto-focus camera as claimed in claim 1, wherein said responsive means is constituted by first and second responsive means, the first responsive means responsive to the first zone signal and the position signal and the second responsive means responsive to the second zone signal and the position signal, and wherein said mode selector switch means being operable, when in the first mode, to establish the electric circuit between the rangefinder and the first responsive means and, when in the second mode, to establish the electric circuit between the manipulatable means and the second responsive means.

3. An auto-focus camera as claimed in claim 2, wherein said rangefinder means has output terminals equal in number to the number of zones of distances away from the camera and includes means for generating the first zone signal through a selected one of said output terminals which corresponds to one of the zones which is actually occupied by the target object, wherein said position signal generating means has output terminals equal in number to the number of the output terminals of the rangefinder means and includes means for successively and sequentially scanning the output terminals of the position signal generating means in accordance with the axial movement of the objective lens means, wherein said manipulatable means has output terminals equal in number to the number of the zones of distances away from the camera and includes means for generating the second zone signal through a selected one of the output terminals which corresponds to the desired one of the focal positions of the objective lens means, wherein said first responsive means includes a generator for generating the focus control signal only when the first zone signal coincides with the position signal applied thereto through one of the output terminals of the position signal generating means which corresponds to said one of the output terminals of the rangefinder means, and wherein said second responsive means includes a generator for generating the focus control signal only when the second zone signal coincides with the position signal applied thereto through one of the output terminals of the position signal generating means which corresponds to said selected one of the output terminals of the manipulatable means.

4. An auto-focus camera as claimed in claim 3, wherein said rangefinder means comprises a light emitter for projecting a beam of light towards the target object to illuminate the latter, and a light receiver for detecting the beam of light reflected from the target object, said light receiver including photoresponsive elements, said first zone signal generating means of the rangefinder means generating the first zone signal through said one of the output terminals of the rangefinder means according to which photoresponsive element has received the reflected beam of light.

5. An auto-focus camera as claimed in claim 1, wherein said drive driving means including an electromagnet unit operable by the focus control signal and a member for arresting the optical support mesns to locate the objective lens means at the focal position determined by the focus control signal when said electromagnet unit is operated in response to the focus control signal.

6. An auto-focus camera as claimed in claim 1, further comprising a shutter release member, said drive means being actuatable to move the objective lens means in operative association with the shutter release member.

7. An auto-focus camera as claimed in claim 3, wherein said rangefinder means comprises a first stationary sensor, including a plurality of photoresponsive elements, a second stationary sensor including a plurality of photoresponsive elements, and means for comparing outputs from the photoresponsive elements of the first stationary sensor with outputs from the photoresponsive elements of the second stationary sensor to determine which output terminal of the rangefinder the first zone signal appears.

8. An auto-focus camera having an objective lens means comprising:
   an auto-focus means for electrically generating an auto-focus signal with respect to an object to be focused;
   a manual-focus means for manually setting an object distance;
   a manual-focus signal generation means for electrically generating a manual-focus signal indicative of said object distance manually set by said manual-focus means;
   an electrical control means, selectively responsible to one of said auto-focus signal and said manual-focus signal, for electrically controlling said objective lens means for focusing; and
   a mode selector switch means for selecting between an auto-focus mode and a manual-focus mode, said electrical control means being electrically responsive to said auto-focus signal in said auto-focus mode, and to said manual-focus signal in said manual-focus mode.

9. An auto-focus camera as claimed in claim 8, wherein said auto-focus means comprises a distance measuring means for measuring a distance to an object to be focused and a signal generation means for generating an electric signal indicative of said distance measured by said distance measuring means, said electrical signal being said auto-focus signal.

10. An auto-focus camera as claimed in claim 9, wherein said electrical control means comprises driving means for driving the objective lens means along the optical axis thereof and stopping means for stopping the movement of the objective lens means driven by said driving means at a position corresponding to one of said auto-focus signal and said manual-focus signal according to the selection by said mode selector switch means.

11. An auto-focus camera as claimed in claim 10, wherein said electrical control means further comprises position detecting means for detecting the position of the objective lens means driven by said driving means for generating a position signal indicative of the position of the objective lens means and an actuating means for actuating said stopping means when said position signal comes into a predetermined relationship with said auto-focus signal when said mode selector switch means selects said auto-focus mode, and when said position signal comes into a predetermined relationship with said manual-focus signal when said mode selector switch means selects said manual-focus mode, whereby said stopping means stops the movement of the objective lens means at a position corresponding to one of said auto-focus signal and said manual-focus signal according to the selection by said mode selector switch means.

* * * * *